INVENTORS
Herbert Weber
Günter Lange
Hubert Müller
Michael Von Fellner &
Roland Heer
BY Spencer & Kaye
ATTORNEYS INVENTORS
Herbert Weber
Günter Lange
Hubert Müller
Michael Von Fellner &
Roland Heer
BY Spencer & Kaye
ATTORNEYS INVENTORS
Herbert Weber
Günter Lange
Hubert Müller
Michael Von Fellner &
Roland Heer
BY Spencer & Kaye
ATTORNEYS INVENTORS
Herbert Weber
Günter Lange
Hubert Müller
Michael Von Fellner &
Roland Heer BY Spencer & Kaye
ATTORNEYS INVENTORS
Herbert Weber
Günter Lange
Hubert Müller
Michael Von Fellner &
Roland Heer
BY Spencer & Kaye
ATTORNEYS United States Patent Office 3,435,376
Patented Mar. 25, 1969

3,435,376

DISTORTION-FREE FREQUENCY MODULATION CIRCUIT

Herbert Weber, Gunter Lange, Hubert Muller, Michael Von Fellner, and Roland Heer, Backnang, Germany, assignors to Telefunken Patentverwertungsgesellschaft m.b.H., Ulm (Danube), Germany Filed June 9, 1965, Ser. No. 462,597
Claims priority, application Germany, June 9, 1964, T 26,332; Dec. 1, 1964, T 27,517
Int. Cl. H03c *3/08*
U.S. Cl. 332—18 8 Claims

ABSTRACT OF THE DISCLOSURE

A frequency modulator circuit with a self-excited transistor connected to have feedback. The circuit includes means for modulating the base voltage of the transistor so as to vary the transistor's collector current dependent transconductance phase and means for simultaneously controlling the transistor base-collector capacitance. The means for controlling the base-collector capacitance is adjusted so that the second and third order modulation distortions due to changes in the base-collector capacitance compensate for the second and third order modulation distortions caused by changes in the transconductance phase.

The present invention relates generally to a modulator circuit, and, more particularly, to a modulator circuit having distortion correction and a self-excited transistor connected to have feedback.

Frequency modulators for a high percentage of modulation and high modulation frequencies which are required, for example, in directive radio transmission systems for a transmission of more than 600 telephone channels, previously operated almost exclusively with reflex klystrons. In such systems, the desired change in the resonance frequency is obtained by varying the reflector voltage of the klystron. The high frequency characteristic of the modulated signal is converted to the 70 megacycle frequency band customary in directive radio transmission systems by down-mixing with the frequency of a further klystron. In this manner, good linearity and a high percentage of modulation are obtained. However, modulators of this type require a large amount of power because of the poor efficiency of the tubes which are employed. Furthermore, they are voluminous and must be balanced again each time a tube is changed, and this is a substantial disadvantage.

With this in mind, it is a main object of the present invention to provide a modulator circuit which avoids the above-mentioned disadvantages.

Another object is to provide a modulator circuit wherein the transconductance phase of the active element is varied.

A further object is to provide a modulator circuit which compensates for modulaton distortions of the second and third order which occur due to the change in the transconductance phase as well as because of the base-collector capacitance per se.

These objects and others ancilliary thereto are accomplished in accordance with preferred embodiments of the invention wherein a modulator circuit is constructed having a self-excited transistor using feedback. The transconductance phase of the transistor is varied to obtain the desired frequency modulation by controlling the base current with the aid of a modulating voltage. For a high percentage of modulation and high modulating frequencies with as little distortion as possible, the present invention may be modified so that in addition to the change in the transconductance phase, the base-collector capacitance is also changed in such a manner that the modulation distortions of the second and third order, which occur because of the change in the transconductance phase as well as because of the change in the base-collector capacitance per se, are compensated.

Additional objects and advantages of the present invention will become apparent upon consideration of the following description when taken in conjunction with the accompanying drawings in which.

FIGURE 6*a* is a plot indicating the dependence of the transmitting frequency on the collector current due to the variation in the transconductance phase.

FIGURE 6*b* is a plot of the differential quotient of the function shown in FIGURE 6*a*.

FIGURE 7*a* is a plot illustrating the dependence of the transmitting frequency because of dependence of the base-collector capacitance, on the collector current.

FIGURE 7*b* is a plot showing the differential quotient of the function of FIGURE 7*a*.

Figure 8:
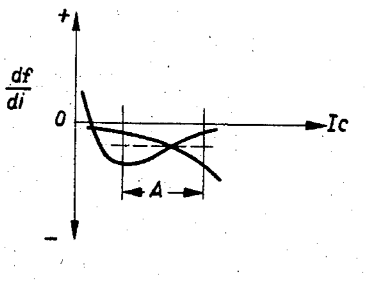

FIGURE 8 is a plot illustrating the functions of FIGURES 6*a* and 6*b* added.

Figure 1:
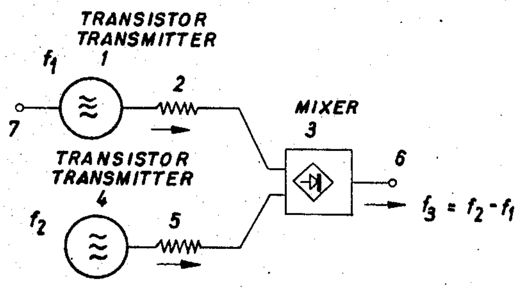
FIGURE 1 is a block diagram schematically indicating the operation of a semiconductor modulator.
Figure 9:
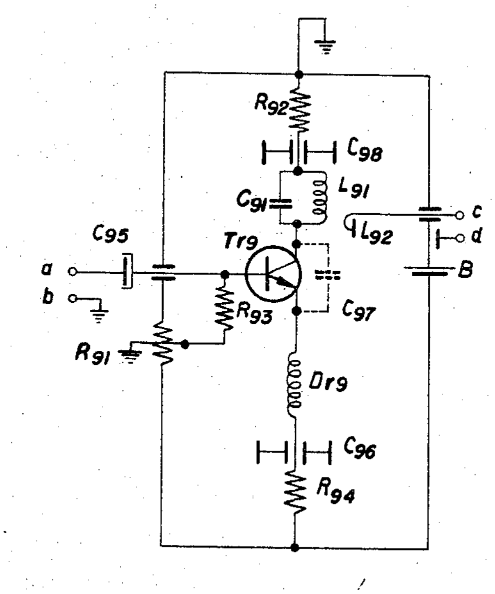

FIGURE 9 is a detailed circuit diagram of a transmitter constructed in accordance with the present invention as indicated in FIGURE 1.

With more particular reference to the drawings, FIGURE 1 shows schematically an arrangement for a semiconductor modulator. The transistor transmitter 1 in this embodiment produces the frequency $f_1$ which may, for example, be 900 megacycles. This frequency is applied to the mixer bridge 3 via the decoupling member 2. The other transistor transmitter 4 produces a frequency $f_2$ of 970 megacycles which is also fed to the mixer bridge 3 via the decoupling member 5. The difference frequency $$(f_2-f_1=f_3)$$

of 70 megacycles is derived and appears at the output terminal 6 of mixer bridge 3. The desired frequency modulation is provided in the transistor transmitter 1 by applying an alternating voltage at its modulating terminal 7.

Figure 2:
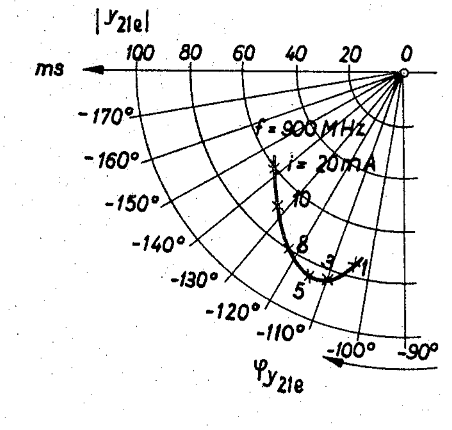
FIGURE 2 is a plot of the collector current.

In the frequency modulation of transistor 1 two transistor properties are utilized which are present in each high frequency transistor. On the one hand this is the transconductance phase $\varphi y_{21e}$ which is dependent upon the collector current. A plot of this is shown in FIGURE 2 in the form of a curve as a function of the frequency and the collector current. It can be seen that when considered at a fixed frequency, the phase angle of the transconductance changes with the collector current. This negative angle increases if the current increases. This phase change can now be used for frequency modulation.

Figure 3:
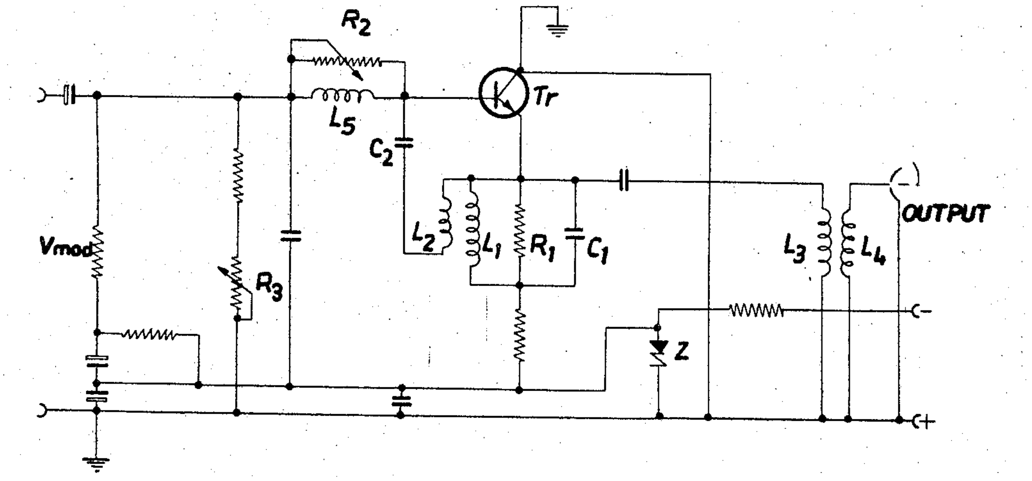
FIGURE 3 is a circuit diagram of a frequency modulator constructed in accordance with the present invention.

With more particular reference to FIGURE 3, a circuit diagram of a frequency modulator constructed in accordance with the present invention is illustrated. This includes a transistor T*r* which is provided with an emitter circuit having a resonant circuit as the frequency determining element. This resonant circuit includes the inductance $L_1$, the attenuation resistor $R_1$ and the capacitor $C_1$. A portion of the emitter voltage is applied, in phase, to the base of the transistor via coupling coil $L_2$ and capacitor $C_2$ in such a manner that self-excitation occurs. In order to achieve the desired frequency modulation with the illustrated circuit, the base current of the transistor is influenced by the modulation voltage $V_{mod}$ which is applied. The modulation voltage is applied to the base of the transistor via an inductance $L_5$ having suitable values and with which an adjustable attenuation resistor $R_2$ is connected in parallel. The change in the transconductance phase of the transistor, that is, in the relationship between the output current and the input voltage, effects a variation of the self-excitation oscillation in the output of the transistor with only minor amplitude modulation occurring. Thus, a frequency-modulated signal can be derived at the output of the circuit. In the illustrated embodiment, decoupling is accomplished inductively, using the two inductances $L_3$ and $L_4$.

The entire frequency modulator has only one active element without an additional modulation amplifier because the current amplification between the base current and emitter current of the transistor is, in practice, used as modulation amplification. Since the modulator circuit furthermore requires only one resonant circuit having relatively low reactive power, a high percent of frequency modulation can be obtained with good linearity. Optimal linearity can conveniently be provided by adjusting the desired operating point using the base voltage divider $R_3$ and the attenuation resistor of the input circuit $R_2$.

The frequency determining portions of the modulator which are dependent upon the temperature can be maintained at a constant temperature in a simple manner by using a thermostat because of the very small structural volume of the circuit. If the transistor is operated in common-collector arrangement then the collector of the modulation transistor can be connected at ground potential and the temperature can be maintained constant by means of a controlled heating current transistor. The small temperature variation of the resonant circuit coil, which is preferably made of ceramic, can then be compensated for using a suitable resonant circuit capacitance having the opposite temperature characteristic. In order to assure that the feed voltage of the transistor is also independent from temperatures, a Zener diode is connected between the connecting terminals of the supply voltage in a conventional manner, as shown in FIGURE 3.

Figure 4:
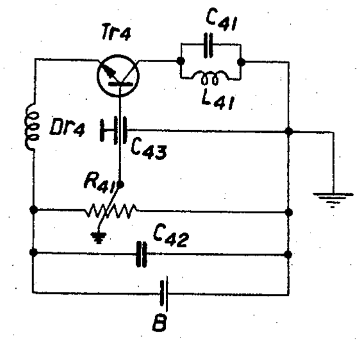
FIGURE 4 is a circuit diagram of a transistor transmitter.

With more particular reference to FIGURE 4, a circuit for a transistorized transmitter is shown. This circuit includes a transistor T*r*4 having a resonant circuit $C_{41}$ and $L_{41}$ connected to its collector. It is provided with a base voltage divider $R_{41}$ which, on the one hand, is connected to ground and, on the other hand, is connected with the emitter of the transistor via a choke D*r*. The battery B is connected in parallel with the base voltage divider $R_{41}$. The battery is also connected in parallel with a capacitor $C_{42}$. If, in a circuit which is so constructed, the collector current is increased, then the output voltage lags with respect to the input voltage of the transistor T*r*4 somewhat more than was the case previously because of the increased phase angle. The phase angle becomes inductive and the self-excited transmitter connected with feedback oscillates at a lower frequency. For this frequency, the resonant circuit causes a phase shift which is opposite to the transconductance phase variation and thus again restores the phase coincidence between the transistor input voltage and the feedback voltage.

The second property of the transistor which can be used for frequency modulation is the variation of the capacitance of the base-collector path with the base-collector voltage which is applied. This capacitance is connected in parallel with the resonant circuit of the transistorized transmitter shown in FIGURE 4, and varies in the same manner as known capacitance diodes, i.e., with decreasing blocking voltage, the capacitance increases. Increase in capacitance causes a decreasing frequency for the transmitter.

It has been proposed to vary the transconductance phase of the transmitter for obtaining frequency modulation in a modulator circuit having a self-excited transistor with feedback. When the requirements as to linearity are high, such as, for example, when transmitting along several hundred telephone channels, undesired distortions occur in this circuit. One of the basic features of the present invention is to simultaneously influence the two transistor functions which have an effect upon the transmitting frequency. In addition to the abovementioned variation of the transconductance phase, control of the base-collector capacitance is simultaneously performed in the abovementioned modulator circuit wherein distortion factors such as non-linear harmonic distortion of the second and third order, occur.

Figure 5:
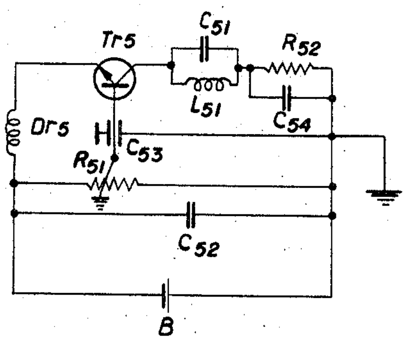
FIGURE 5 is a circuit diagram of a modulator which differs from the circuit of FIGURE 4.

With more particular reference to FIGURE 5, the circuit diagram of such a modulator is illustrated. This circuit differs from the circuit of FIGURE 4 in that between the collector circuit $C_{51}$ and $L_{51}$ of the transistor T*r*5 and ground, there is a resistor $R_{52}$ connected which is bridged by a capacitor for the oscillator frequency. The resistor $R_{52}$ in the collector circuit is used so that when the collector current varies, the voltage drop at the resistor varies and, thus, simultaneously, the base-collector voltage varies. For increasing current, there is a decrease in the frequency because of the rising transconductance phase as well as because of the decreased base-collector voltage. Thus, both functions operate in the same direction and are added. Considered individually, the two functions are greatly non-linear and would not be sufficient for fulfilling the requirements as to linearity. The distortion factors of the second and third order of the two functions in each case vary oppositely so that when selecting the correct operating point on the characteristic curve, the distortion factors can be made zero across a certain range of the collector current.

Figure 6:
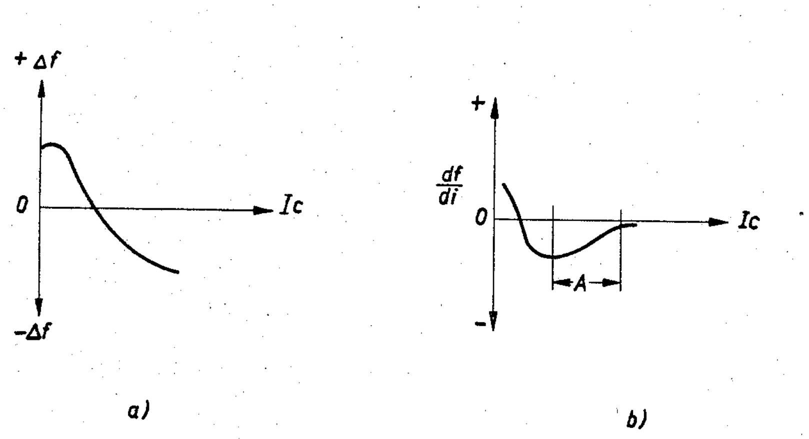

With more particular reference to FIGURE 6, the abovementioned individual functions and their differential quotients are shown. FIGURE 6*a* shows the dependence of the transmitting frequency *f* upon the collector current Ic because of the variation of the transconductance phase. FIGURE 6*b* shows the curve of the differential quotient of the function shown in FIGURE 6*a*. In the portion A the curve of the differential quotient is positive and rises with increasing current, i.e., the distortion factors $K_2$ and $K_3$ are positive.

Figure 7:
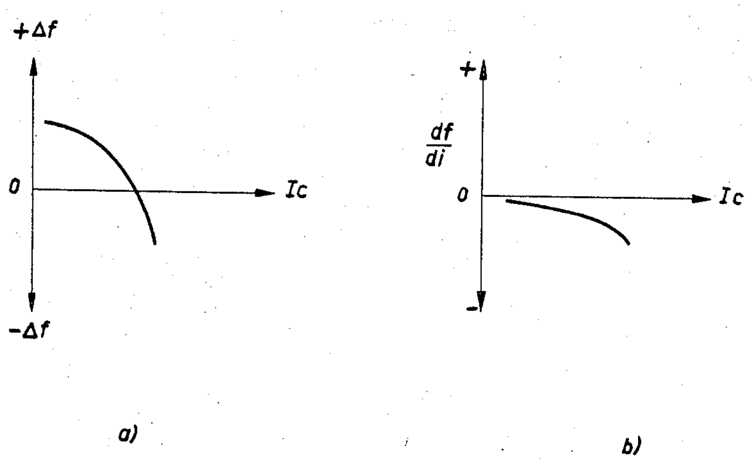

With more particular reference to FIGURE 7, FIGURE 7*a* illustrates the dependence of the transmitting frequency *f* on the base-collector capacitance which depends on the collector current Ic. FIGURE 7*b* shows a curve of the differential quotient of the function set forth in FIGURE 7*a*. The slope is negative and decreases with increasing current, that is, the harmonic distortion factors of the second and third order $K_2$ and $K_3$ are both negative.

With more particular reference to FIGURE 8, this figure illucstrates the two functions of FIGURES 6*b* and 7*b* added together which produces the dashed line from which it can be seen that in the range A a sufficient degree of linearity is present. The functions of FIGURES 6*b* and 7*b* are illustrated in solid lines and the result is illustrated by the dashed line.

With more particular reference to FIGURE 9, a detailed circuit diagram of a transmitter constructed in accordance with the present invention is illustrated (element 1 in FIGURE 1). The transmitter is constructed of a self-excited transistor T*r*9 connected with feedback. The modulation voltage is applied to the base of this transistor via the coupling capacitor $C_{95}$ and the input terminals *a* and *b*. If a better decoupling is required between the oscillator and the modulation source, then the modulation voltage can also be applied to the emitter. A base voltage divider $R_{91}$ is provided. The resistor $R_{93}$ which is connected between the base of the transistor and the tap of the resistor $R_{91}$ is provided with such a value that the appearance of the modulation voltage at the base voltage divider is prevented. The collector circuit for the transistor includes a capacitor $C_{91}$ and an inductance $L_{91}$ which are connected in parallel.

The modulation resistor $R_{92}$ in a corresponding manner as does the modulation resistor in the circuit of FIGURE 5, connects the far end of the collector circuit with ground, that is, the end of the collector circuit opposite the end connected to the transistor. The collector circuit is grounded by means of a capacitor $C_{98}$ which is connected between the resistor $R_{92}$ and the collector circuit. A choke D*r*9 is connected with the emitter of the transistor and a resistor $R_{94}$ is connected between the negative pole of battery B and the choke D*r*9. This resistor is connected in circuit to provide for negative feedback for the modulation frequencies in order to obtain a linear relationship between the base input voltage and the collector current. The feedback for the transistor T*r*9 is accomplished via the feedback capacitance $C_{97}$ shown in dashed lines. The output voltage from the circuit is obtained at the terminals *c* and *d*. Decoupling is accomplished using a coupling loop $L_{92}$ which is coupled with the inductance of the collector circuit. The high frequency choke D*r*9 is grounded via a capacitor $C_{96}$ at its far end with respect to the transistor.

The aforementioned capacitors $C_{43}$, $C_{53}$, $C_{96}$ and $C_{98}$ are lead-through capacitors with minimum inductivity.

By means of the modulator circuit having the values in accordance with the present invention, linearity is provided which fulfills all of the requirements. The construction of the circuit is extremely simple so it is possible to avoid the disadvantages of previous modulators using reflex klystrons, and the good electrical properties of such modulators are maintained. Furthermore, this circuit makes it possible to individually measure the distortions occurring in the individual elements when constructing a modulator circuit as shown in FIGURE 1.

In a practical embodiment of the invention the elements of the circuit of FIGURE 9 had the following values:

| | |
|---|---|
| $C_{91}$—0.8 bis 8.5 pf. | $R_{92}$—100–400Ω. |
| $C_{96}$—100 μf. | $R_{93}$—10KΩ. |
| $C_{96}$—90 pf. | $R_{94}$—200Ω. |
| $C_{97}$—ca. 2 pf. | $L_{91}$—0.0025 μh. |
| $C_{98}$—40 pf. | $L_{92}$—ca. 0.0005 μh. |
| $R_{91}$—5KΩ. | D*r*9—ca. 1 μh. |
| T*r*9—2N2857 (RCA). | |

It will be understood that the above description of the present invention is susceptible to various modifications, changes, and adaptations, and the same are intended to be comprehended within the meaning and range of equivalents of the appended claims.

What is claimed is:

1. An oscillator circuit comprising, in combination:

(a) a transistor;

(b) means connected to said transistor for producing self-oscillations by said transistor;

(c) input means for modulating the base voltage of said transistor to vary the collector current dependent transconductance phase of said transistor, thereby to vary non-linearly the frequency of the oscillations; and (d) a resistor, connected in the collector circuit of said transistor, for controlling the base-collector capacitance of said transistor, thereby to vary non-linearly the frequency of the oscillations, the value of said resistor being selected so that the second and third order modulation distortions which arise from the non-linearity due to the variations in the base-collector capacitance substantially cancel the second and third order modulation distortions which arise from the non-linearity due to variations in the transconductance phase, over the range of operation of the circuit.

2. A circuit as defined in claim 1, wherein said resistor in connected to ground.

3. A circuit as defined in claim 1 wherein said collector circuit is connected to the collector of the transistor, a resistor is connected in series with the collector circuit, and a capacitor bridges said resistor for the oscillator frequency.

4. A circuit as defined in claim 3 wherein a coupling capacitor is connected between the emitter and base of the transistor and the source of modulation voltage.

5. A circuit as defined in claim 4 wherein a voltage divider is connected to the base of the transistor and resistor means connected between the voltage divider and the base of the transistor and having such a value as to prevent the modulation voltage from appearing at the voltage divider.

6. A circuit as defined in claim 1 wherein a collector circuit is connected to the collector of the transistor, and loop means coupled with the collector circuit for coupling out the output voltage.

7. A circuit as defined in claim 1 wherein there is negative feedback for the modulation frequencies and a choke is connected to the emitter of the transistor, a battery, and a resistor are connected between the choke and the negative pole of the battery.

8. A circuit as defined in claim 3 wherein said collector circuit includes a capacitance and an inductance in parallel.

References Cited

UNITED STATES PATENTS

| | | | |
|---|---|---|---|
| 2,771,584 | 11/1956 | Thomas | 331—117 |
| 3,108,234 | 10/1963 | Burns | 331—117 |
| 3,292,106 | 12/1966 | Baldwin | 331—114 |

OTHER REFERENCES

Electronics Industries, p. 224, October 1960, 331–117.

JOHN KOMINSKI, *Primary Examiner.*

U.S. Cl. X.R.

331—117; 332—16